United States Patent

Lai et al.

(10) Patent No.: US 7,035,250 B2
(45) Date of Patent: Apr. 25, 2006

(54) SYSTEM FOR ORGANIZING VOICE CHANNEL DATA FOR NETWORK TRANSMISSION AND/OR RECEPTION

(75) Inventors: Carl Wing Yan Lai, Fremont, CA (US); Sridhar G. Sharma Isukapalli, Fremont, CA (US); Gary Tsztoo, Saratoga, CA (US)

(73) Assignee: UTStarcom, Inc., Alameda, CA (US)

( * ) Notice: Subject to any disclaimer, the term of this patent is extended or adjusted under 35 U.S.C. 154(b) by 910 days.

(21) Appl. No.: 09/929,655

(22) Filed: Aug. 13, 2001

(65) Prior Publication Data
US 2005/0002409 A1    Jan. 6, 2005

(51) Int. Cl.
H04L 12/66 (2006.01)
(52) U.S. Cl. ............. 370/352; 370/401; 370/412
(58) Field of Classification Search ........ 370/352–356, 370/401, 465, 412, 428
See application file for complete search history.

(56) References Cited

U.S. PATENT DOCUMENTS

| 4,156,112 A | 5/1979 | Moreland |
| 4,534,024 A | 8/1985 | Maxemchuk et al. |
| 4,771,425 A | 9/1988 | Baran et al. |
| 5,345,445 A | 9/1994 | Hiller et al. |
| 5,477,541 A | 12/1995 | White et al. |
| 5,526,353 A | 6/1996 | Henley et al. |
| 5,566,170 A | 10/1996 | Bakke et al. |
| 5,684,954 A | 11/1997 | Kaiserswerth et al. |
| 5,787,115 A * | 7/1998 | Turnbull et al. ............ 375/222 |
| 5,790,538 A | 8/1998 | Sugar |
| 5,793,978 A | 8/1998 | Fowler |
| 5,867,677 A | 2/1999 | Tsukamoto |
| 6,157,653 A | 12/2000 | Kline et al. |
| 6,208,662 B1 | 3/2001 | O'Neill et al. |
| 6,215,685 B1 | 4/2001 | Fung et al. |
| 6,243,667 B1 | 6/2001 | Kerr et al. |
| 6,304,574 B1 * | 10/2001 | Schoo et al. ............... 370/401 |
| 6,311,212 B1 | 10/2001 | Chong et al. |
| 6,343,072 B1 | 1/2002 | Bechtolsheim et al. |
| 6,504,838 B1 * | 1/2003 | Kwan ........................ 370/352 |
| 6,738,916 B1 * | 5/2004 | Gladden et al. ............ 713/400 |
| 2001/0030966 A1 | 10/2001 | Choi |
| 2002/0038379 A1 | 3/2002 | Sato et al. |
| 2005/0002409 A1 * | 1/2005 | Lai et al. ................... 370/412 |

* cited by examiner

Primary Examiner—Ricky Ngo
Assistant Examiner—Nittaya Juntima
(74) Attorney, Agent, or Firm—Felix L. Fischer

(57) ABSTRACT

A system (100) is disclosed that may transfer voice data from multiple channels between an asynchronous data network (102) and a synchronous data network (104). A system (100) may include an egress block and associated structures (200) and/or an ingress block and associated structures (900). An egress block (200) may read voice channel data from a local buffer (206) and write such data to a voice packet buffer memory (VPBM) (204). At least a portion of a VPBM write address may be generated from a time stamp value. An ingress block (900) may read voice channel data from a jitter buffer (918) and write such data to a local buffer (906). At least a portion of a jitter buffer read address may be generated from a time stamp value.

20 Claims, 8 Drawing Sheets

SYSTEM FOR ORGANIZING VOICE CHANNEL DATA FOR NETWORK TRANSMISSION AND/OR RECEPTION

TECHNICAL FIELD

The present invention relates generally to systems for processing network voice data, and more particularly to systems that receive and/or transmit voice data from multiple voice channels.

BACKGROUND OF THE INVENTION

Data communication networks may be generalized into at least two types: asynchronous and synchronous. Provided such networks remain independent, performance characteristics and transmission latencies are understood, and in many cases predictable. However, in light of the convergence of disparate networks, there arises a need to provide methods and systems for interconnecting asynchronous networks with synchronous networks. Asynchronous networks typically operate under well known protocols, including by not limited to, the Transmission Control Protocol (TCP), Internet Protocol (IP), User Datagram Protocol (UDP) to name but a few. A well known synchronous network approach includes time division multiplexing (TDM), which can allocate particular data channels to predetermined time slots.

One very particular application for interconnecting asynchronous and synchronous systems includes voice data. Conventional voice data examples will now be described.

As data networks proliferate, it is becoming an increasingly desirable goal to integrate transmission of voice and data. Transmitting voice data over a data network (voice over network) can provide advantages over other approaches. Voice over network can take advantage of existing network structures. Further, networks (including the Internet) continue to grow in size and in bandwidth, and so may be more capable of carrying voice and data. Voice over network can be more efficient than data over voice as such systems are typically packet based. In a packet based system, bandwidth can be used as needed. When data is transmitted, a data packet can be sent through the network. When voice is needed, a voice packet can be transmitted through the network.

Voice over networks can also provide additional cost savings, as voice may be transmitted between locations without incurring conventional toll charges. This can be particularly true for systems that transmit voice over the Internet.

Many networks can be "connectionless" networks. Connectionless networks can provide multiple possible paths between source and destination. Consequently, in some cases, voice transmitted over such networks may be more reliable as voice data can reach a destination even if some of the network nodes are not operational. One type of voice of network approach utilizes the Internet protocol (IP), and is often referred to as voice-over-IP (VoIP).

Data networks may take a variety of forms. As noted above, a data network may be a connectionless network, including the Internet. Further, a network may include portions that are overlaid and/or integrate connection-oriented data streams. Such systems include Internet protocol (IP) over asynchronous transfer mode (ATM), IP switching systems, and multiprotocol label switching (MPLS), or similar switching systems.

Voice data transmitted over a network may take a variety of forms. Typically, voice data samples may be "packetized." Packetizing can include combining a voice data sample payload with corresponding packet "header" information. As is well known, header information can control how a packet is transmitted. Unfortunately, packetization can introduce delay, contributing to overall latency in a voice data sample. Latency can be the delay between the generation of voice data (e.g., speaking) and the endpoint reception of voice data (e.g., hearing).

Voice over network systems can often be conceptualized as including an "egress" path and an "ingress" path for voice data. An egress path may include the various processing steps that receive voice data, packetize such voice data, and then transmit the resulting packet over a network. An ingress path may include the various processing steps that extract voice data from a network packet and eventually provide such voice data to an endpoint.

Various proposals for implementing voice over data networks have been proposed. One general approach is the idea of a network "gateway." A network gateway can provide access to a network (such as the Internet) for a variety of conventional voice data sources (voice channels). As but one example, a network gateway can be an IP gateway that integrates a PBX with an IP network. In such an arrangement, users may make telephone calls that appear entirely conventional, but are in fact being transmitted over a data network.

According to one conventional approach, a network voice packet can be forwarded to a destination according to conventional protocols, such as TCP/IP. A destination can include conventional network hardware, such as a network interface card, which can receive the packet. A general purpose processor can then extract voice data within the packet (including any decoding/decompressing) and then play the voice data over sound card, or the like. Such computation steps can contribute significantly to latency. Further, such approaches are typically directed to a single voice channel, and not for multiple voice channels.

According to another conventional approach, a network can include a network phone (such as an "IP Phone"). A network phone can have its own network address, and include packet processing and voice data processing hardware. Again, typical IP Phone applications are directed toward single voice channels.

Various conventional approaches to decreasing voice data latency have addressed transmission delays. In particular, some network routers may be capable of giving particular packets priority over others. As but one example, some packet headers can include a "type of service" or "quality of service" field. A network voice packet can be given higher precedence than other packets, thereby reducing latency when compared to other packets. A drawback to such approaches is that all routers/switches in the network must have such an advanced processing capability, and thus can be expensive to implement. Consequently, such an approach may be better suited for enterprise wide area networks (WANs), instead of a larger network structure such as the Internet.

Other approaches may also address transmission latency. In particular, a network transmission route may be essentially reserved for predetermined voice packet flow. One such approach is the Resource ReserVation Protocol (RSVP). RSVP, like the priority approach noted above, can rely on more complex routers and thus can be an expensive solution. In another conventional packet forwarding approach, to help improve the processing of time dependent data, including voice data, other protocols have been proposed. One such protocol is the Real-Time Transport Protocol (RTP). An RTP header can provide sequence and time stamp information than may help assemble voice data once it has been received. RTP is described in detail in Request for Comments (RFC): 1889, "RTP: A Transport Protocol for Real-Time Applications", Feb. 22, 2001.

While various conventional approaches have addressed reducing transmission delay, it would be desirable to reduce any delay introduced by an egress path. It would be further desirable if such an approach could accommodate multiple voice channels, as well.

SUMMARY OF THE INVENTION

According to one embodiment of the present invention, a voice data processing system may include a source buffer for storing voice channel data and a destination buffer for receiving voice channel data from a source buffer. A status store may also be included that stores status information on the various voice channels. A processing system may access a status store, and then generate write addresses to a destination buffer for only those voice channels having a predetermined status.

According to one aspect of the embodiments, a system may include an egress block, a destination buffer may be a voice packet buffer memory (VPBM) that is coupled to an asynchronous data network, and a source buffer may be a local buffer that is coupled to a synchronous data network. A status store may include valid data and silent data. An egress block may read voice channel data from a local buffer for only those voice channels that are valid and not silent. Such voice data may then be written to with a write address to a VPBM.

According to another aspect of the embodiments, a status store may include a dual port random access memory.

According to another aspect of the embodiments, voice channel data in VPBM may be arranged in groups according to a sample size value. A VPBM write address may include at least a portion of a time stamp count value. The larger a sample size is, the more bits of a time stamp are used to generate a VPBM address.

According to another aspect of the embodiments, a local buffer may include a first buffer and a second buffer. A first buffer may store voice data for one period time, while a second buffer may store voice data for another period of time.

According to another aspect of the embodiments, a system may include an ingress block, a destination buffer may be a local buffer that is coupled to a synchronous data network, and a source buffer may be a jitter buffer that is coupled to an asynchronous data network. An ingress block may read voice channel data from a jitter buffer for only those voice channels that are valid. Such voice data may then be written to with a write address to a local buffer. A jitter buffer read address may include at least a portion of a time stamp count value.

According to another aspect of the embodiments, voice channel data in a jitter buffer may be arranged in groups according to a sample size value. A jitter buffer read address may include at least a portion of a time stamp count value. The larger a sample size is, the more bits of a time stamp are used to generate a jitter buffer address.

DETAILED DESCRIPTION OF THE EMBODIMENTS

Various embodiments of the present invention will now be described with reference to a number of drawings. The various embodiments disclose a system that may transfer voice data between an "asynchronous" voice data source, such as a connectionless or connection-oriented data network and a "synchronous" voice data source, such as time division multiplexed (TDM) voice system.

Figure 1:
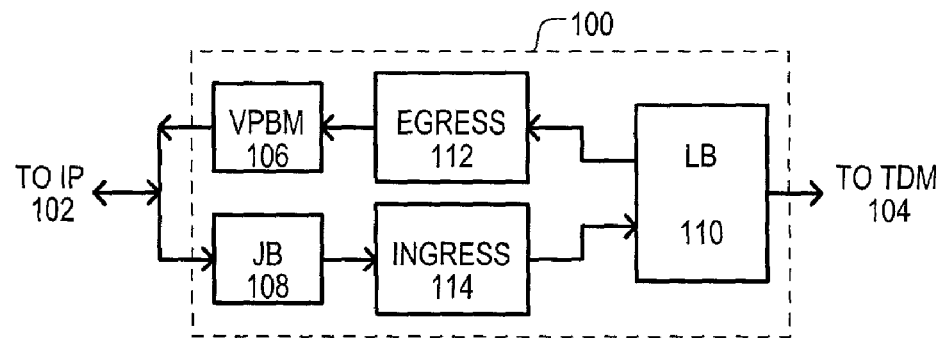
FIG. 1 is a block diagram of a system according to one embodiment.

FIG. 1 shows a block diagram of a system according to one embodiment. A system according to the present invention may include a system 100 that can be situated between an asynchronous voice data source 102 (shown as IP, for Internet Protocol) and a synchronous voice data source 104 (show as TDM). In one configuration, a system 100 may include a voice packet buffer memory (VPBM) 106 and a "jitter" buffer 108 that are connected to an asynchronous voice data source 102. A local buffer 110 may be connected to a synchronous voice source 104.

If a system 100 is viewed with respect to a synchronous voice data source 104, a system 100 may include an "egress" block 112 and an "ingress" block 114. An egress block 112 may handle transfers of voice data from a synchronous voice data source 104 to an asynchronous voice data source 102. An ingress block 114 may handle transfers of voice data from an asynchronous voice data source 102 to a synchronous voice data source 104. Even more particularly, an egress block 112 may transfer voice data from a local buffer 110 to a VPBM 106, while an ingress block 114 may transfer voice data from a jitter buffer 108 to a local buffer 110.

Having described the general arrangement of a system according to one embodiment, the operation of an egress block will now be described.

Figure 2:
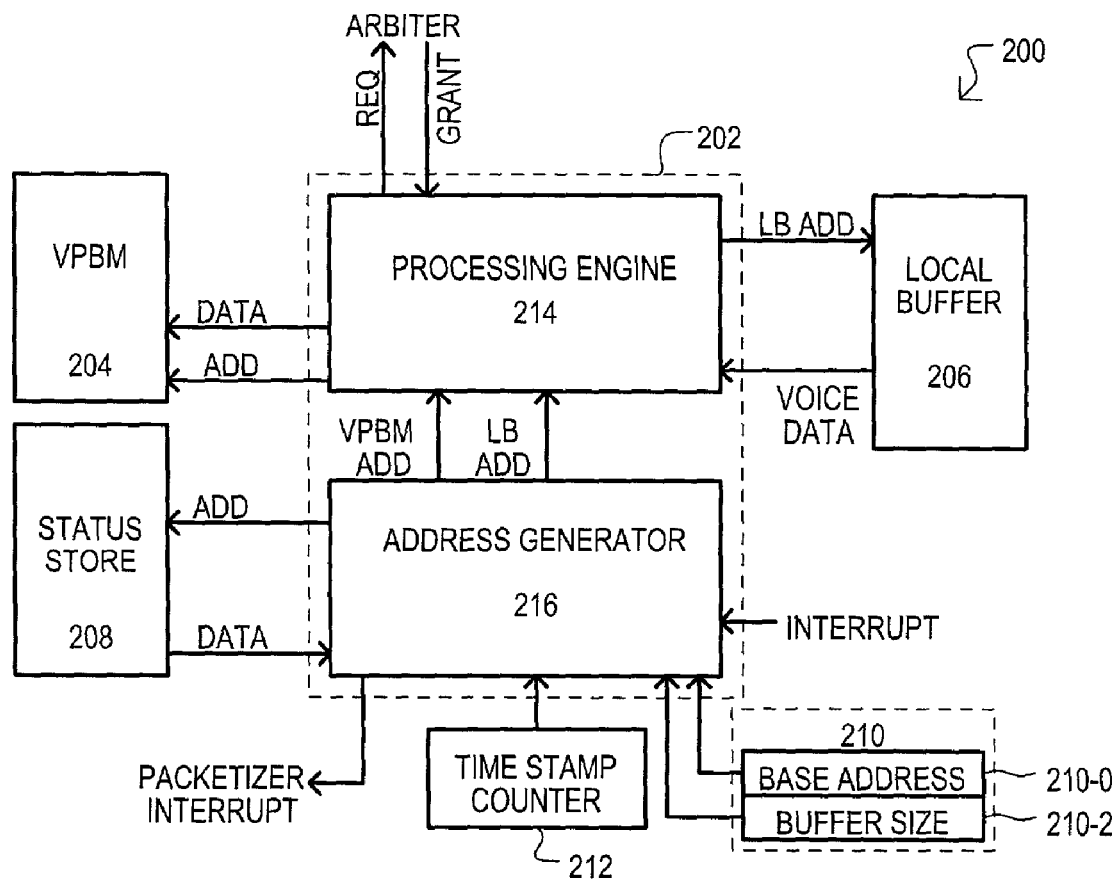
FIG. 2 is a block diagram of an egress block and associated structures according to one embodiment of the present invention.

An example of a system that includes an egress block and associated structures is shown in FIG. 2. The system is designated by the general reference character 200 and may include a processing system 202, a voice packet buffer memory (VPBM) 204, a local buffer 206, and a status store 208. In addition, a processing system 202 can include a register set 210 that can provide various values, and a time stamp counter 212 that can provide time stamp values to a processing system 202.

A processing system 202 may include a processing engine 214 and address generator 216. A processing engine 214 may perform predetermined functions according to instructions and/or hardware design. An address generator may generate address values for reading data from and writing data to various memory locations of a system 200.

In general, in an egress mode of operation, a processing system 202 may access data for multiple voice channels stored in local buffer 206, and output such voice data to a VPBM 204. However, instead of accessing data for all possible voice channels, a processing system 202 may first examine a status store 208 to output data for only selected voice channels. More particularly, status information can be used to determine if a voice channel is silent (not active) and/or stores invalid data, in which case such voice data is not output to a VPBM 204.

In this way, voice data from extraneous voice channels may be ignored, and only voice data for valid and active voice channels may be copied for packetization. This may reduce delay in processing multiple voice channel data.

Referring once again to FIG. 2, an address generator 216 is shown to receive various input signals and values. An address generator 216 may receive an interrupt that initiates an address generating process. In addition, an address generator 216 may access various values from register set 210. In particular, an address generator 216 may receive a base address value from base address register 210-0 and a buffer size value from a buffer size register 210-2. Address generator 216 may also receive a count value from a time stamp counter 212.

A time stamp counter 212 may be a counter type circuit that periodically increments a count value. In one arrangement, a time stamp counter 212 may generate a time stamp count value that is essentially synchronized with another system that is sending and receiving voice data.

In an arrangement such as that shown in FIG. 2, data for a given voice channel may be stored in a VPBM 204 in a data block. A time stamp count (provided by a time stamp counter 212) can determine the location of a voice data within such a data block.

Having described the general arrangement of an egress block and associated structures 200 according to one embodiment, the operation of such a system will now be described.

In an egress operation, a local buffer 206 may receive data for multiple voice channels. As but one example, voice data may be received in a time division multiplexed (TDM) format, with data of a different voice channel occupying a particular time slot. Voice data for each timeslot may be written to a predetermined location within local buffer 206. Once an entire set of voice data has been written (e.g., an entire TDM "frame" of voice data is received by a local buffer 206), an interrupt may be generated for an address generator 216.

In response to an interrupt, an address generator 216 may read status information from a status store 208 and generate corresponding addresses for a local buffer 206 and VPBM 204. In particular case, an address generator 216 may read status information for multiple voice channels from a status store 208. If such status information indicates a voice channel contains "good" voice data (e.g., valid and not silent), a read and write address may be generated for the voice channel. In this way, a sequence of read and write addresses may be provided to a processing engine 214.

A processing engine 214 may access a local buffer 206 with a read address to receive voice data for a given channel. Subsequently, processing engine 214 may request access to VPBM 204 from an arbitrating circuit. If access is granted, voice data read from a local buffer 206 may be written into a VPBM 204 according to a corresponding write address.

In this way, an address generator 216 may examine status information from a status store 208 and generate addresses for only those voice channels that contain valid output data. This can avoid the unnecessary copying of voice data from a local buffer 206 to a VPBM 204, which may reduce latency in the processing of voice data.

Having described on particular system, various examples of possible system components will now be described in detail.

Figure 3:
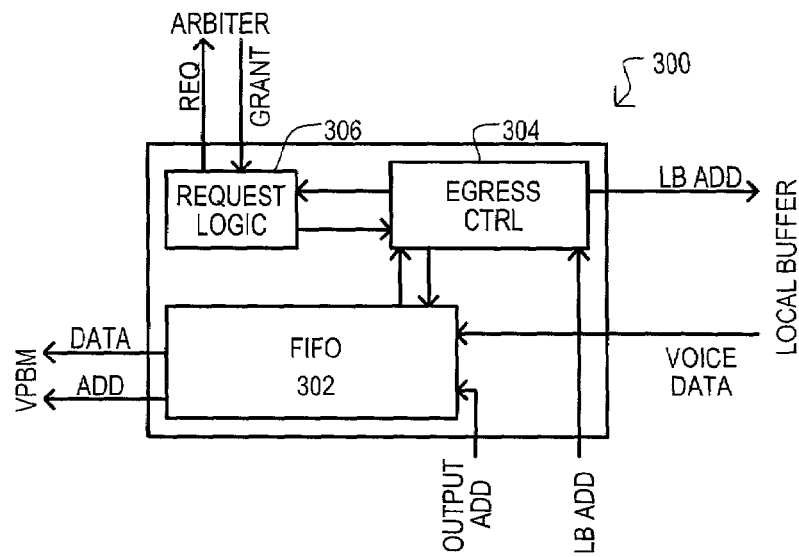
FIG. 3 is a block diagram of a processing engine according to one embodiment of the present invention.

Referring now to FIG. 3, a block diagram is set forth illustrating a processing engine according to one embodiment. A processing engine is designated by the general reference character 300 and may correspond to a processing engine 214 shown in FIG. 2.

A processing engine 300 may include a first-in-first-out type store (FIFO) 302, an egress control 304, and request logic 306. An egress control 304 may receive a local buffer address (LB ADD). A local buffer address (LB ADD) may be applied as a read address to a local buffer (not shown in FIG. 3). In response to a voice data read address, a local buffer may return voice channel data (VOICE DATA).

A FIFO 302 may receive voice data and a VPBM address as inputs. An egress control 304 may input a data into FIFO 302 that includes both voice data and a corresponding VPBM address (VPBM data/address pair). In this way, a sequence of VPBM data/address pairs may be stored within a processing engine 300. Upon requesting and receiving a grant from an arbiter, a processing engine may output VPBM data/address pairs. In response to such output values, voice data may be written to locations determined by corresponding VPBM addresses.

In this way, a processing engine 300 may be capable of accumulating voice data and VPBM addresses, and then outputting such values to for subsequent storage in a VPBM.

Figure 4:
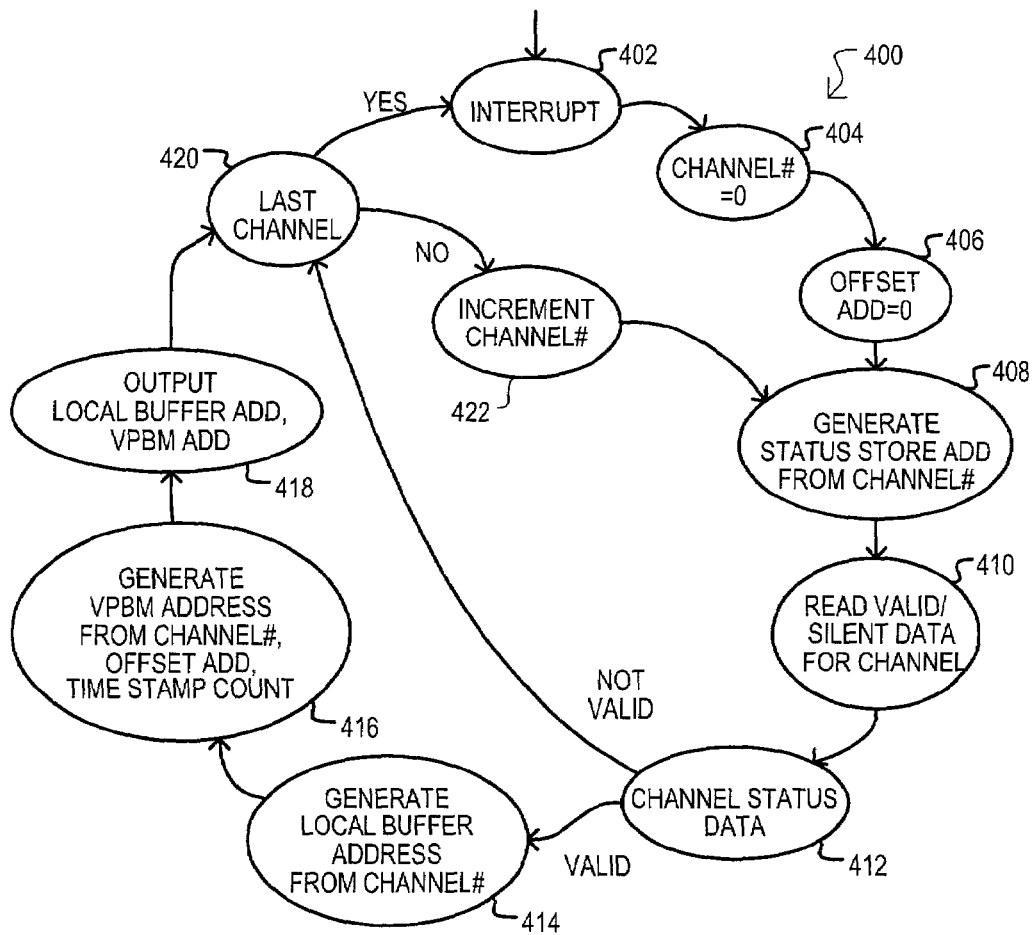
FIG. 4 is a state diagram showing the operation of an address generator according to one embodiment of the present invention.

While an address generator may take a variety of forms, one particular address generator is shown as a state diagram in FIG. 4. As is well understood in the art, such a state diagram may be implemented by a programmed processor, hardware, and/or some combination thereof. In the case of a processor, functional steps may be programmed for subsequent execution by a processor. In the case of hardware, functional steps may be implemented by a higher level design language, and then synthesized into circuits.

Referring to FIG. 4, an address generator 400 may begin generating addresses upon receiving an interrupt 402. An interrupt 402, as noted in conjunction with FIG. 2, may indicate that a voice data for multiple channels has been received, and may be ready to be read. Of course, other signals and/or conditions can begin an address generating operation.

Variables used for generating addresses may be set to initial values. In the particular example of FIG. 4, a channel number value (CHANNEL#) may be set to zero 404 and an address offset value (OFFSET ADD) may also be set to zero.

An address generator 400 may then generate one or more addresses for accessing a status store 408. As noted in conjunction with FIG. 2, a status store may contain information on the status of particular channels. In a preferred embodiment, a single read operation from a status store may provide status information on multiple channels. Such an arrangement can speed address generating operations by reducing the number of operations that may be necessary to access status information. In one very particular arrangement, a status store address may be generated from a channel number value.

An address generator 400 may then read status information according to a status store address 410. In the example of FIG. 4, a step 410 may include reading "valid" information as well as "silent" information for a number of channels. In one very particular approach, a status store address may access one memory to get valid information and a different memory to get status information.

Channel status data may then be examined to determine if a channel is valid 412. If a channel is valid, silent information for the channel may also be examined. If a channel is not silent, the channel may be considered valid, and an address may proceed by generating a local buffer address.

It is noted that when an address generator generates addresses, one particular type of status information may take precedence over the other. According to one embodiment, valid status information may take precedence over silent information. Thus, if a channel is invalid, an address will not be generated for the channel regardless of whether the channel is silent or not. Looked at in another way, address may only be generated for valid, active (e.g., not silent) channels.

A local buffer address may be generated according to a channel number value 414. As noted above, a local buffer may include a series of entries, each of which stores voice data for a particular channel. Thus, a step 414 may include using a channel number as the address for a corresponding local buffer location. As but one of the many possible alternatives, a channel number could be added to a base address to arrive at a local buffer entry. A more particular example of a local buffer addressing arrangement will be described below.

An address generator 400 may also generate a corresponding VPBM address. As shown in FIG. 4, a VPBM address can be generated from a channel number, an offset address (OFFSET), a buffer size and a time stamp count value. A more particular example of a VPBM and the generation of a VPBM address will be described at a later point herein.

Having generated a local buffer address and VPBM address, such addresses may then be provided as output values 418.

Once a voice data/VPBM address pair has been output 418, or if status information for a channel indicates a channel is not valid 412, a channel number can be examined to determine if it is a last channel 420. If a last channel has not been reached, a channel number may be incremented 422, and an address generator may return to a step 408. If a last channel has been reached, an address generator can wait for a next set of voice channel data.

In this way, an address generator 400 may sequence through a set of voice data channels, and generate voice data/VPBM address pairs for only those channels that are valid (e.g., valid and not silent).

It is noted that an address generator 400 may be subject to some variation. In particular, as noted above, a single read operation 410 may retrieve status information for multiple channels, but not all channels. Thus, such a read operation may have to be periodically repeated until status data for all voice channels have been read. As but one very particular example, a read operation to a status store may retrieve status information for 32 channels. Addresses may then be generated for any of the 32 channels that are valid (and not silent). Status information for a next group of voice channels may then be read, and addresses may then be generated for those channels that are valid. Such a process may be repeated until status information has been read for all channels.

Figure 5:
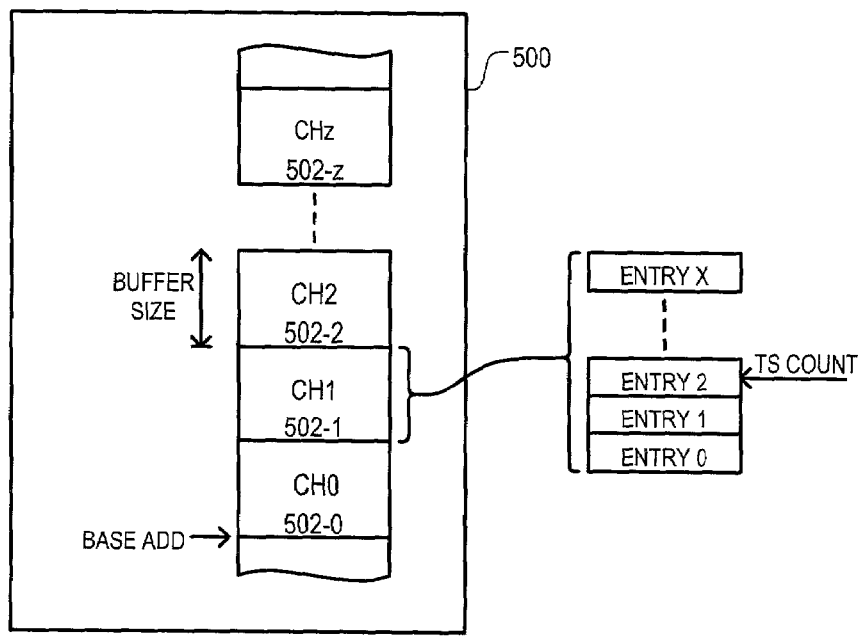
FIG. 5 is a block diagram illustrating a VPBM, and the generation of a VPBM address according to one embodiment.

Referring now to FIG. 5, an example of a VPBM, and the generation of a VPBM address is shown in a block diagram. A VPBM 500 may include a number of entry groups 502-0 to 502-z. Each entry group may be a data block that stores sequential voice data for one voice channel. The number of entries in each group can be the same, and dictated by a buffer size value. A base address (BASE ADD) can point to the start of a VPBM 500. In the example of FIG. 5, each entry group (502-0 to 502-z) may include "x" entries. One of x entries can be selectable according to a time stamp count value.

An example of an access to a VPBM 500 will now be described. An address generator (such as 300) may receive a channel number value, a base address value (BASE ADD), a buffer size value, and a time stamp count value (TS COUNT). An output address value may be generated according to the expression shown below.

OUTPUT ADD=(BASE ADD)+
(CHANNEL#*BUFFER)+(TS COUNT)

As shown in FIG. 5, multiplying a channel number by a buffer size value, and adding the product to a base address can point to the bottom of an entry group (502-0 to 502-z) (i.e., index to one particular voice channel group). A time stamp count value may then point to a particular entry in a group.

In this way, data for a particular channel may be written to particular a VPBM entry according to a channel number value, buffer size, and time stamp count.

It is understood that various bits of a time stamp count can be used according to a buffer size. In one very particular arrangement, buffer sizes may vary by powers of two (e.g., 16 ms, 32 ms, 64 ms or 128 ms). The number of bits utilized from a time stamp count value to index an entry in an entry group (502-0 to 502-z) may vary according to buffer size. As but one example, a time stamp count may include at least eight bits. In the case of a 16 ms buffer size, five bits [4:0] may be used to index an entry. In the case of a 32 ms buffer size, six bits [5:0] may be used to index an entry. In the case of a 64 ms buffer size, seven bits [6:0] may be used to index an entry. In the case of a 128 ms buffer size, eight bits [7:0] may be used to index an entry. It is understood that such a time stamp count can "roll over" periodically, returning to all zero bit values.

Figure 6:
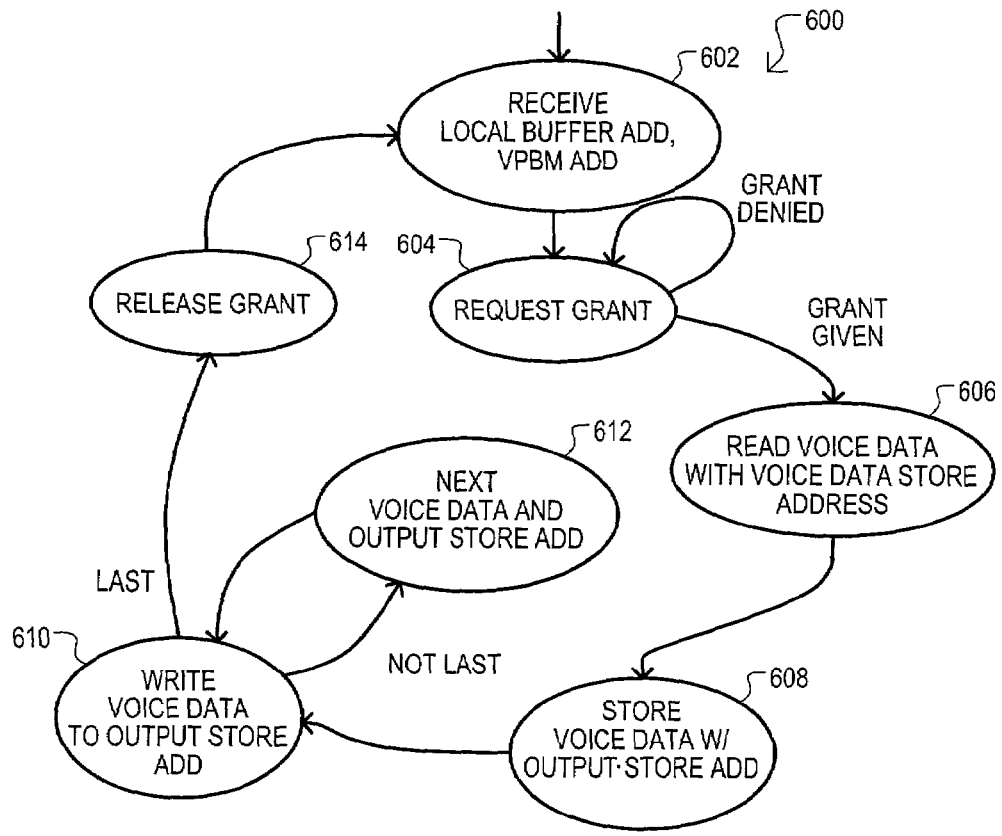
FIG. 6 is a state diagram showing the operation of a processing engine according to one embodiment of the present invention.

Just as an address generator may take a variety of forms, so may a processing engine. One particular processing engine is shown as a state diagram in FIG. 6. Referring now to FIG. 6, a processing engine 600 may receive local buffer addresses with corresponding VPBM addresses 602. Upon receiving such values, a processing engine may request access to a VPBM. In the particular example of FIG. 6, a processing engine 600 may request a grant 604 from a bus arbiter, or the like, that can control access to a VPBM. If a grant is denied, a VPBM may be busy (e.g., a VPBM may be "packetizing" voice channel data). If a grant is given, voice data may be read from a local buffer according to a received address 606.

In response to such a read operation, a processing engine 600 may store voice data with a corresponding VPBM address 608. As was illustrated in FIG. 3, according to one particular embodiment, a processing engine 300 may include a FIFO for storing such data/address pairs. A processing engine 300 may then write stored voice data to its corresponding VPBM address 610.

If more voice data remains in a processing engine 600, write operations may continue by moving onto a next voice data/VPBM address pair 612. If a last voice data value is written, a processing engine may release a grant 614 and wait for more addresses.

A processing engine 300 may be subject to some variation. As but one example, voice data and VPBM addresses may be received in bursts. Similarly, voice data may be written to a VPBM in bursts. As but one very particular example, a processing engine 300 can sequentially store four voice data/VPBM address pairs, and sequentially write four voice data values with a FIFO or the like.

Figure 7:
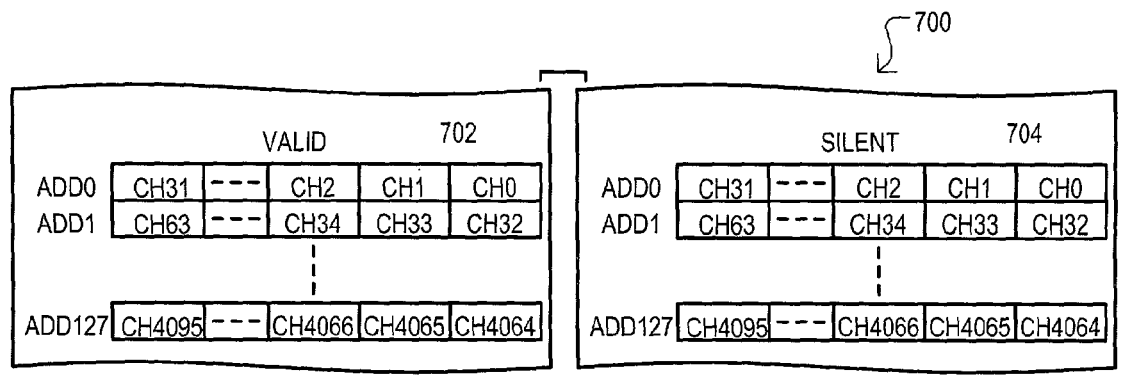
FIG. 7 is a block diagram illustrating a status store according to one embodiment.

Referring now to FIG. 7, a more particular example of a status store is set forth in a block diagram. A status store 700 may include a valid store 702 and a silent store 704. A valid store 702 may store valid information for a number of channels. As noted above, valid information may indicate when a channel is valid or invalid. Voice data for invalid channels may then be ignored. Similarly, silent information may indicate when a channel is silent or active. This can enable voice data for a silent channel to be ignored.

According to one approach, valid information for each channel may be represented by a single bit. Thus, a single read operation can retrieve valid information for multiple channels. Thus, in the example of FIG. 7, a single read to address ADD0 of valid store 702 can retrieve 32 bits of valid information for channels 0 to 31. Similarly, silent information for each channel may be represented by a single bit. Thus, in the example of FIG. 7, a single read to address ADD0 of silent store 704 can retrieve 32 bits of valid information for channels 0 to 31.

FIG. 7 also illustrates how an address generator may read status information for multiple channels. In particular, an address generator (such as 216) can read address ADD0 of valid store 702 and silent store 704. According to received status information, an address generator may generate addresses for any valid channels (that are not silent) for channels 0–31. An address generator may then read address ADD1 of valid store 702 and silent store 704, and generate addresses for any valid, not silent channels for channels 32–63. This may continue until status information is read for all channels in a local buffer.

A valid store 702 and silent store 704 may preferably include dual port random access memories (DPRAMs). Such an arrangement can allow for valid/silent data to be rapidly updated as channels fail and/or become silent. In one very particular embodiment, a status store 700 may include two 128×32 dual port memories, one memory serving as a valid store 702 and the other serving as a silent store 704.

Figure 8:
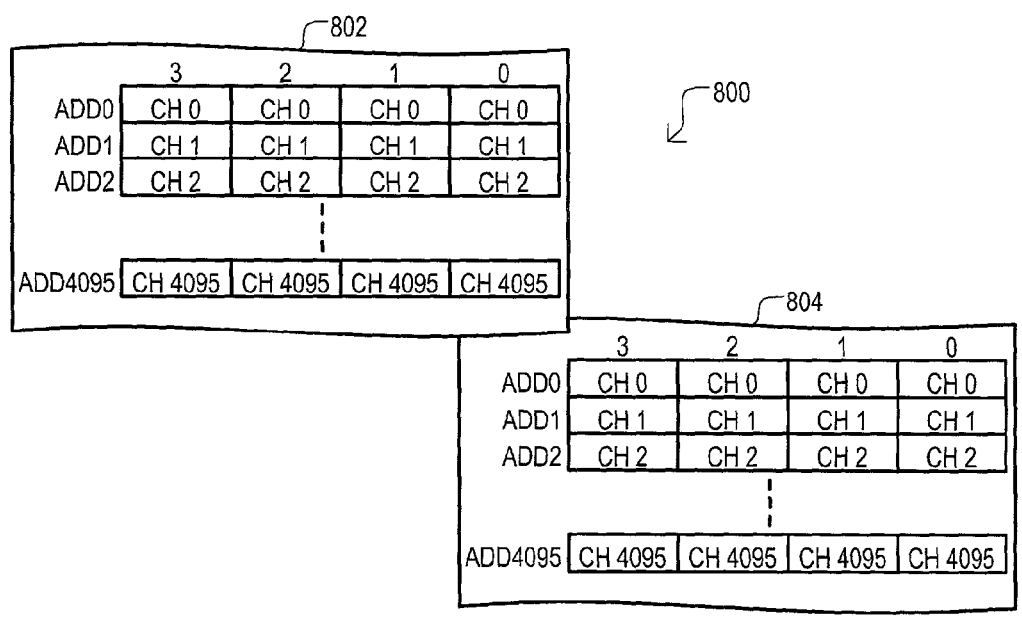
FIG. 8 is a block diagram illustrating a voice data store according to one embodiment.

Referring now to FIG. 8, one example of a local buffer is shown in a block diagram and designated by the general reference character 800. A local buffer 800 may include a first buffer 802 and a second buffer 804. First and second buffers (802 and 804) may alternately store particular voice data time segments. As but one very particular example, data for voice channels 0–4095 may be transmitted in TDM frames. A first frame, representing a time t0 may be stored in a first buffer 802. A second frame, representing a subsequently time t1 may then be stored in a second buffer 804. Once selected voice data has been read from a first buffer 802, a third frame, representing a time t3 may then be written into a first buffer 802. Such a double-buffered arrangement may reduce latency, as it may be easier to ensure that voice data is always ready to be read from a local buffer.

Each entry of a buffer (802 and 804) may be divided into portions. In the example of FIG. 8, each entry is divided into four portions. Such an arrangement may allow for rapid processing of voice data. In one very particular example, each portion may represent eight bits. Thus, each entry may store 32 bits of voice data for a given channel.

FIG. 8 also shows how a channel number value may be used as an address for a local buffer. That is, address ADD0 may be accessed for channel 0, while address ADD4095 may be accessed for channel 4095. Of course, as noted above, address ADD0 could be some base address, and a channel number could be added to such a base address to arrive at an appropriate local buffer address.

Like a status store, a local buffer may preferably be a dual port memory. Such an arrangement can allow for voice data to be rapidly written into a local buffer. In one very particular embodiment, a local buffer 800 may include two 4K×32 dual port memories, one memory serving as a first buffer 802, the other serving as a second buffer 804. Each 32-bit entry may store 0.5 ms of voice data for a particular voice channel.

Of course, FIG. 8 shows a preferred approach, and should not necessarily be construed as limiting the invention thereto.

Having described an egress engine and associated structures, an ingress engine and associated structures will now be described.

Figure 9:
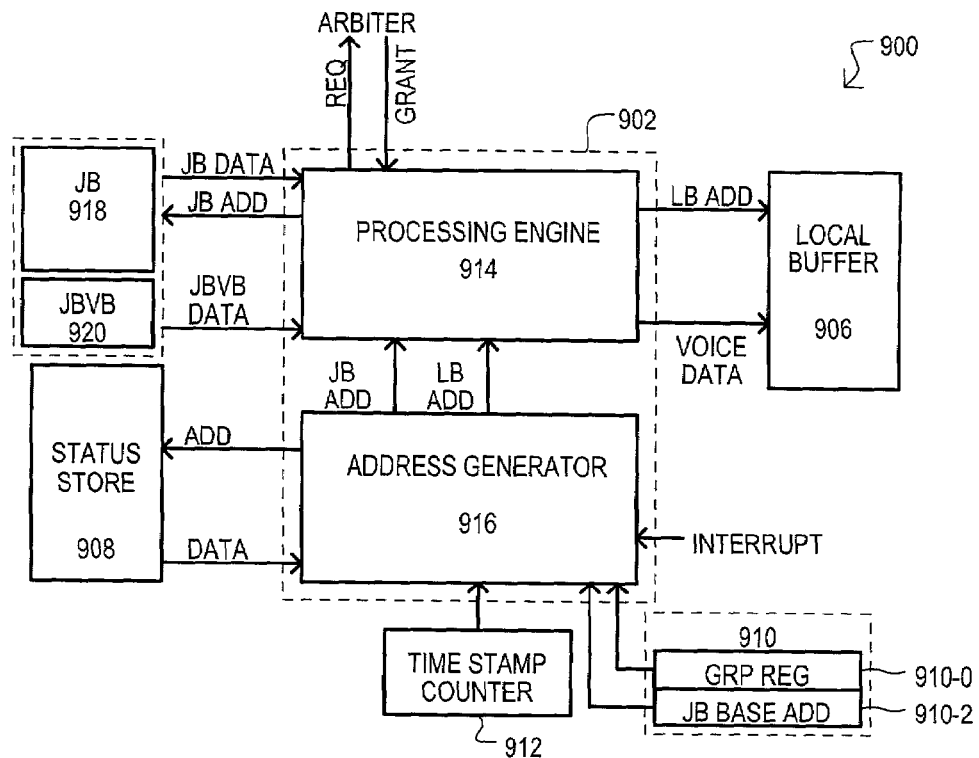
FIG. 9 is a block diagram of an ingress block and associated structures according to one embodiment of the present invention.

An example of a system that includes an ingress block and associated structures is shown in FIG. 9. The system is designated by the general reference character 900 and may include some of the same general constituents as an egress block and associated structures, including a processing system 902, a local buffer 906, and a status store 908. In addition, a processing system 902 can include a register set 910 that can provide various values, and a time stamp counter 912 that can provide time stamp values to a processing system 902. Unlike an egress engine and associated structures, an ingress engine and associated structures may include a jitter buffer 918 and jitter buffer valid bit (JBVB) memory 920.

A processing system 902 may include a processing engine 914 and address generator 916. A processing engine 914 may perform predetermined functions according to instructions and/or hardware design. An address generator may generate address values for reading data from and writing data to various memory locations of a system 900.

In general, in an ingress mode of operation, a processing system 902 may access data for multiple voice channels stored in a jitter buffer 918, and output such voice data to a local buffer 906. Like the egress case described above, instead of accessing data for all possible incoming voice channels, a processing system 902 may first examine a status store 908 to output data for only selected voice channels. More particularly, status information can be used to determine if a voice channel is valid. If a voice channel is valid, data for such a voice channel may be copied from a jitter buffer 918 and written to a local buffer 906.

In this way, voice data from extraneous voice channels may be ignored, and only voice data for valid and active voice channels may be copied to a local buffer 906. This may reduce delay in processing multiple voice channel data.

Referring once again to FIG. 9, an address generator 916 is shown to receive various input signals and values. An address generator 916 may receive an interrupt that initiates an address generating process. In addition, an address generator 916 may access various values from register set 910. In particular, an address generator 916 may receive a value from a group register 910-0 and values from jitter buffer base address registers 910-2. As in the ingress case, an address generator 916 may also receive a count value from a time stamp counter 912.

A time stamp counter 912 may have the same general properties as time stamp counter 212 described with reference to FIG. 2

In an arrangement such as that shown in FIG. 9, data for an incoming voice channel may be stored in a jitter buffer 918. More particularly, data for a given voice channels may be stored in jitter buffer 918 in a data block. A time stamp count (provided by a time stamp counter 912) can determine the location of a voice data within such a data block.

Having described the general arrangement of an ingress block and associated structures 900, the operation of such a system will now be described.

In an ingress operation, a jitter buffer 918 may receive data for multiple voice channels. As but one example, voice data may be received in packet format. Header and/or other extraneous information may be stripped away and a resulting voice payload may be stored in a jitter buffer 918 on a channel-by-channel basis. In addition, a record may be maintained in a jitter buffer valid bit (JBVB) memory 920 that can indicate if voice data in a jitter buffer 918 is valid or not. For example, if voice data for a given channel corrupted and/or not received within a predetermined amount of time, one or more bits in a JBVB memory 920 may be changed to indicate that the corresponding jitter buffer 918 data is not valid.

In response to an interrupt, an address generator 916 may read status information from a status store 908 and generate corresponding addresses for a local buffer 906 and jitter buffer 918. In one approach, an address generator 916 may read status information for multiple voice channels from a status store 908. If such status information indicates a voice channel contains "active" voice data, a read address (for jitter buffer 918) and write address (for local buffer 906) may be generated for the voice channel. In this way, a sequence of read and write addresses may be provided to a processing engine 914.

Upon receiving a jitter buffer 918 read address and local buffer 906 write address for a voice channel, a processing engine 914 may request access to a jitter buffer 918 from an arbitrating circuit. If access is granted, voice data and valid data may be read from a jitter buffer 918 and JBVB memory 920. If JBVB memory valid data indicates that voice data is valid, a processing engine 918 may then write the voice data to a local buffer 906. If JBVB memory valid data indicates that voice data is invalid, a processing engine 918 may compensate for such invalid data.

In this way, an address generator 916 may examine status information from a status store 908 and generate addresses for only those voice channels that contain valid input data. This can avoid the unnecessary copying of voice data from a jitter buffer 918 to a local buffer 906.

Having described on particular system, various examples of possible system components will now be described in detail.

Figure 10:
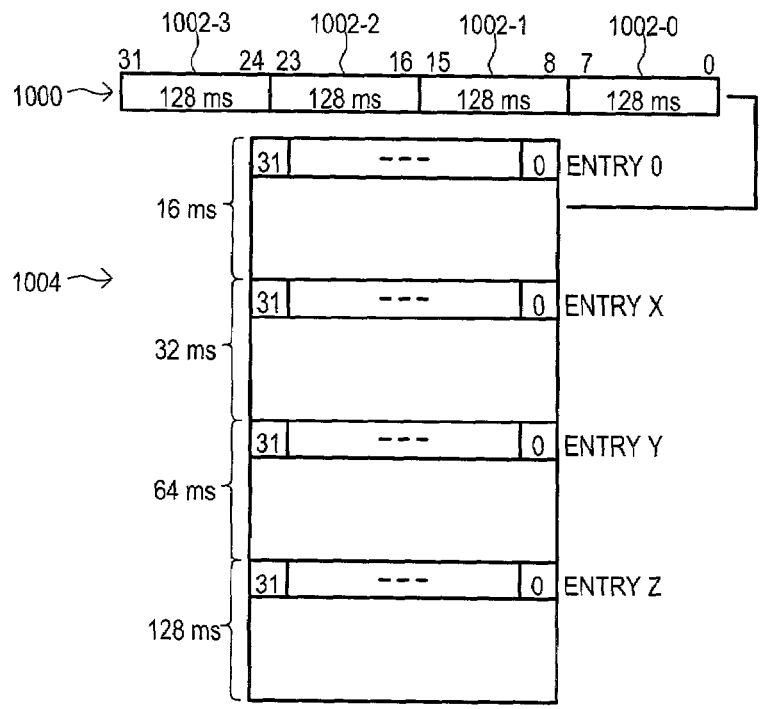
FIG. 10 is a block diagram showing a group register and status store according to one embodiment.

Referring now to FIG. 10, a block diagram is set forth showing one example of a group register (such as 910-0 in FIG. 9) and a status store (such as 908 in FIG. 9). In FIG. 10, a group register 1002 may include various fields 1002-0 to 1002-3 that can indicate how status data is arranged in status store 1004.

A status store 1004 may include a number of entries arranged according to sample size group. In the example of FIG. 10, a status store 1004 can include 128 entries (ENTRIES 0–127), arranged according to group sample size (16 ms, 32 ms, 64 ms, 128 ms). Each entry can indicate the status of 32 channels of a given sample size. As shown in FIG. 10, a 16 ms status data group begins at ENTRY 0, a 32 ms status data group begins at ENTRY X, a 64 ms status data group begins at ENTRY Y, and 128 ms status data group begins at ENTRY Z.

As noted, a group register 1002 can indicate how status data is arranged in a status store 1004. In one approach, each field 1002-0 to 1002-3 can identify the first entry of a status group. Thus, in the example of FIG. 10, a field 1002-0 can store the value zero, a field 1002-1 can store the value X, a field 1002-2 can store the value Y, and a field 1002-3 can store the value Z.

As in the case of an egress block, an address generator of an ingress block may take a variety of forms. One particular address generator is shown as a state diagram in FIG. 11.

Figure 11:
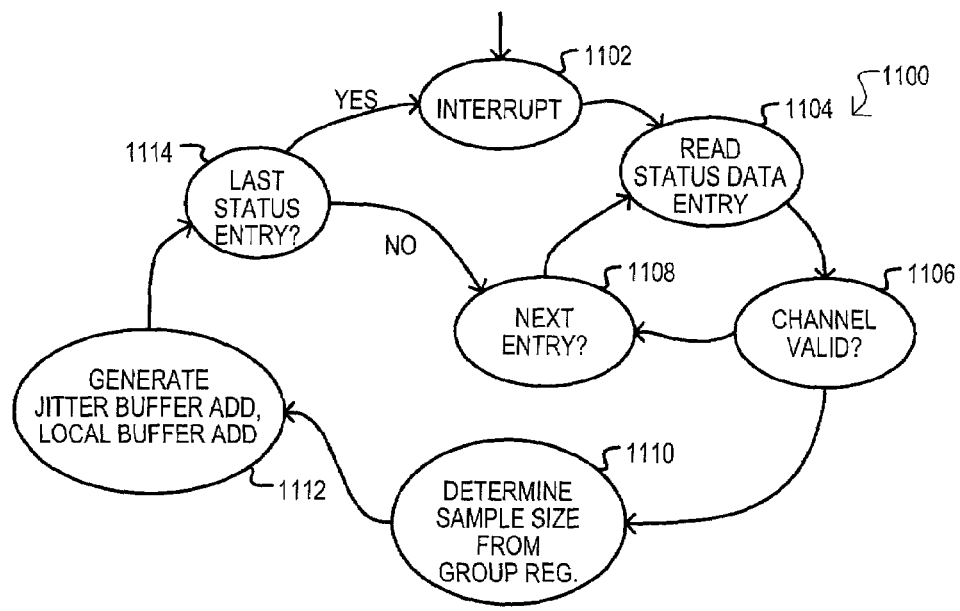
FIG. 11 is a state diagram showing the operation of a processing engine according to one embodiment of the present invention.

Referring to FIG. 11, an address generator 1100 may begin generating addresses upon receiving an interrupt 1102.

An address generator 1100 may then read a status store entry 1104. Such an operation can begin at entry zero, and continue until all entries are read, as will be described below. As noted in conjunction with FIG. 10, a status store may contain information on the status of particular channels. In a preferred embodiment, a single read operation from a status store may provide status information on multiple channels. Such an arrangement can speed address generating operations by reducing the number of operations that may be necessary to access status information.

An address generator 1100 may then examine status data that has been read to determine if any channels are active 1106. If no channels are valid in the status data entry, a next status store entry can be accessed 1108. This may include simply incrementing a status store address by one. If a status store entry indicates a channel is valid, a group register may be examined to determine a sample size 1110.

A step 1110 may be understood with reference to FIG. 10. In determining a sample size for a given valid channel, a step 1110 may include comparing a current status store address with the various fields (1002-0 to 1002-3) of a group register. Thus, if it is assumed a status store is arranged like that of FIG. 10, if a current status store address is greater than 0 but less than X, a sample size is 16 ms. Similarly, if a current status store address is greater than Y but less than Z, a sample size is 64 ms.

Once a sample size has been determined, an address generator 1100 can generate jitter buffer address and local buffer address 1112. A particular approach for generating such address values will be described below in more detail. Such a jitter buffer address may be a read address for a processing engine, and such a local buffer address may be a write address for a processing engine.

Referring again to FIG. 11, an address generating operation may end when a last status store entry is read 1114. If a last entry has not been read, a next entry may be read 1108. Once all entries a read, an address generator 1100 may wait for a new interrupt 1102.

Figure 12:
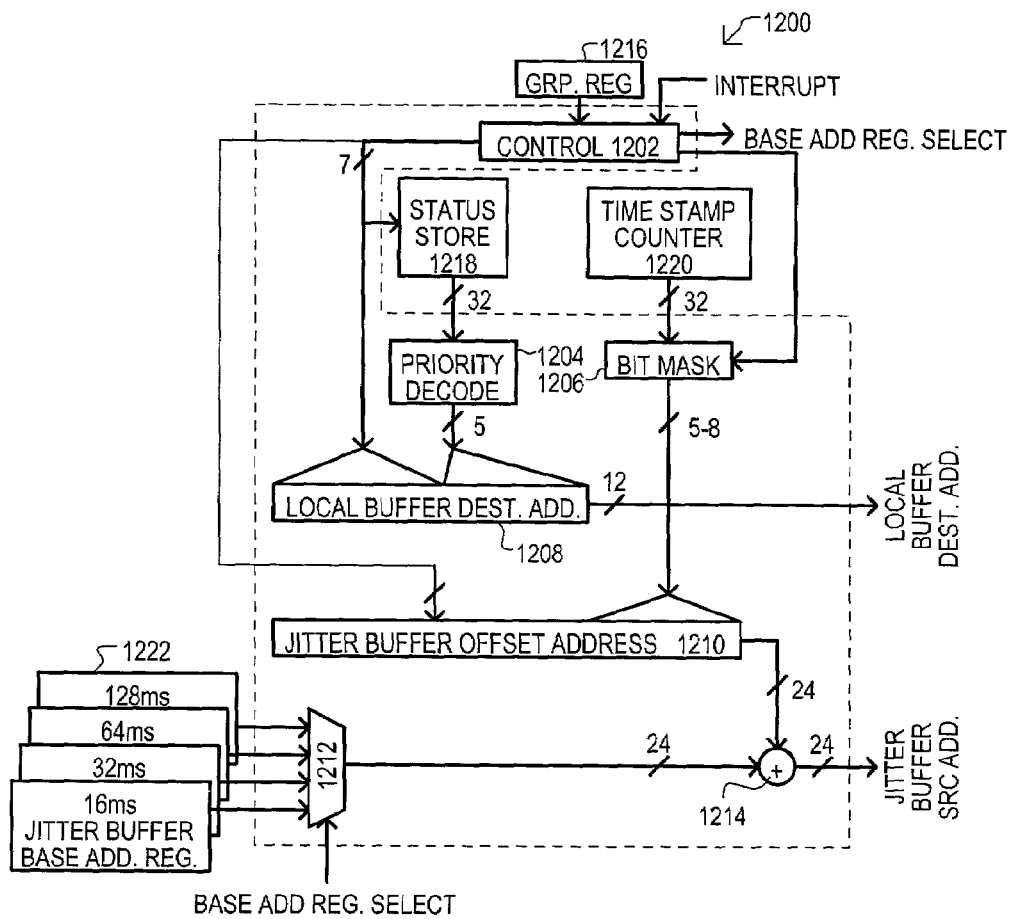
FIG. 12 is a block diagram of an address calculator for an ingress block according to one embodiment.

While various approaches for generating a jitter buffer and local buffer address could be employed, one particular approach is shown in a block diagram in FIG. 12. FIG. 12 shows an address calculator function 1200 that may generate addresses according to step 1112 in FIG. 11. An address calculator function 1200 may include a control function 1202, a priority decoder function 1204, a bit mask function 1206, a local buffer address output 1208, a jitter buffer offset address output 1210, a base address selector function 1212, and an adding function 1214.

In addition, an address calculator function 1200 may receive various input values. A group register 1216 may be accessed to get a group register value. A group register 1216 may be the same as that shown as item 1004 in FIG. 10 and/or 910-0 in FIG. 9. An interrupt may also be received. Such an interrupt may be the same as that shown in FIG. 9. A status store 1218 may be accessed to get status information on channels. A status store 1218 may be same as that shown as item 1004 in FIG. 10 and/or 908 in FIG. 9. A time stamp count value may be received from a time stamp counter 1220. A time stamp counter 1220 may be the same as a time stamp counter shown as 912 in FIG. 9.

Still further, as shown in FIG. 12, a base address selector function 1212 may select a jitter buffer base address from jitter buffer base address registers 1222. Jitter buffer base address registers 1222 may be the same as those shown as item 910-2 in FIG. 9.

Having described the general parts of an address calculator function 1200, an address calculator operation will now be described.

Upon receiving an interrupt, a control function 1202 may read status store entries until an entry containing a valid channel is found. Such an operation may include reading a status store entry bit values, where a "0" indicates an inactive channel and "1" indicates an active channel. If a status store entry contains an active channel (e.g., at least one of its bits is a "1"), the status store 1218 entry containing the active channel may be output to a priority decoder function 1204. A priority decoder function 1204 may generate a bit value according to the particular location of a "1" in a status store entry value. As but one example, if the 32nd bit of a 32-bit status store entry was a "1", a priority decoder could output a 5-bit value of "11111."

In the case of multiple active channels in the same status store entry, a priority decoder function 1204 can sequentially generate addresses for each active voice channel indicated by such an entry. As but one example, if the $32^{nd}$ bit of a 32 bit status store entry was a "1" and the $1^{st}$ bit of the same entry was also a "1," a priority decoder function 1204 could output a 5-bit value of "11111" and then "00000."

In the particular example of FIG. 12, a status store 1218 may include 128 entries, and thus can be accessible by a 7-bit status store address. This 7-bit address can form a first portion of a local buffer address. Accordingly, FIG. 12 shows a 7-bit status store address being supplied to a local buffer address output 1208. An output from a priority decoder function 1204 may form a second portion of a local buffer address 1208. FIG. 12 shows a 5-bit priority decoder output being supplied to a local buffer address output 1208. A local buffer address output 1208 may then be applied as a destination address for a local buffer.

In addition to determining which particular channels are active, a control function 1202 may also determine a buffer size for each active channel. Such a function may include comparing a current status store address (i.e., the address of a status store entry that indicates an active channel) to fields in a group register 1216. Such a function was previously described in conjunction with FIG. 10. In the particular example of FIG. 12, determining a buffer size may include indicating if a buffer size is 16 ms, 32 ms, 64 ms or 128 ms. A buffer size can determine the operation of a bit mask function 1206 and a base address selector function 1212.

Referring to FIG. 12, a status store address may form one portion of a jitter buffer offset address output 1210. Another portion of a jitter buffer offset address output 1210 may be provided by a bit mask function 1206. More particularly, a bit mask function 1206 may provide a selected portion of a time stamp count value as a second portion of a jitter buffer offset address output 1210. In the particular example of FIG. 12, if a buffer size is 16 ms, five bits [4:0] of a time stamp count value may be output. If a buffer size is 32 ms, 6 bits [5:0] of a time stamp count value may be output. If a buffer size is 64 ms, 7 bits [6:0] of a time stamp count value may be output. If a buffer size is 128 ms, 8 bits [7:0] of a time stamp count value may be output.

An adding function 1214 may add a jitter buffer offset address output 1210 to a base address to generate a jitter buffer source address. A base address may be selected by a base address selector function 1212 according a sample size value. In the arrangement of FIG. 12, a 16 ms, 32 ms, 64 ms or 128 ms base address may be added to a jitter buffer offset address output 1210 to generate a jitter buffer source address.

FIG. 12 has shown one example of address generation for an ingress operation. It is noted that an egress operation may have a similar approach for generating addresses for a VPBM and local buffer address. One particular approach is shown in a block diagram in FIG. 13. An address calculator function 1300 according to FIG. 13 may include a control function 1302, a priority decoder function 1304, a bit mask function 1306, a local buffer address output 1308, a VPBM offset address output 1310, a base address selector function 1212, an adding function 1314, and a multiplying function 1316.

In addition, an address calculator function 1300 may receive various input values. A group register 1318 may be accessed to get a group register value and an interrupt may also be received that can initiate a data transfer function. A status store 1320 may be accessed to get status information on channels. A time stamp count value may be received from a time stamp counter 1322. Still further, as shown in FIG. 13, a base address selector function 1312 may select a VPBM base address from base address registers 1324.

Having described the general parts of an address calculator function 1300, an address calculator operation will now be described.

Upon receiving an interrupt, a control function 1302 may read status store entries until an entry containing a valid channel is found. Such an operation may be essentially the same as that described in conjunction with FIG. 12.

Figure 13:
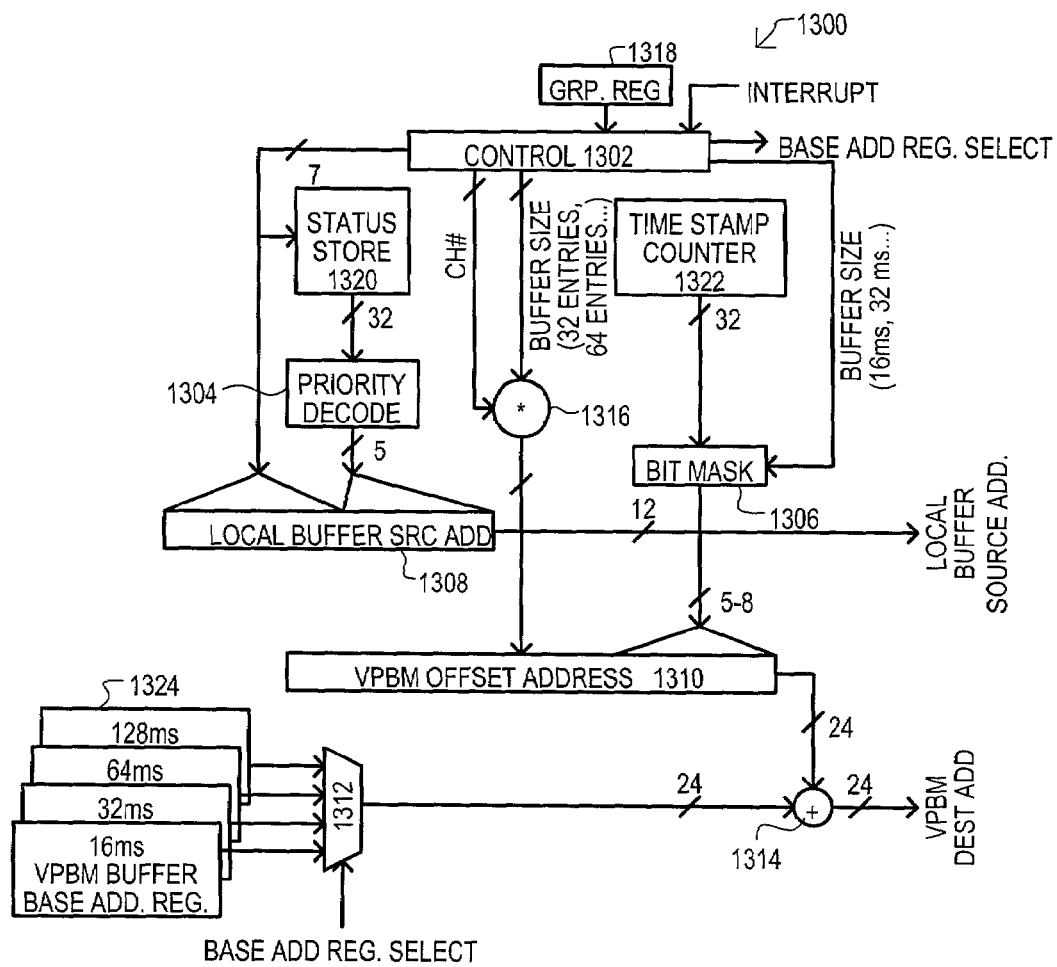
FIG. 13 is a block diagram showing a processing engine that may be included in an ingress block according to one embodiment.

Like FIG. 12, in example of FIG. 13, a status store 1320 may include 128 entries, and thus can be accessible by a 7-bit status store address. This 7-bit address can form a first portion of a local buffer address. Accordingly, FIG. 13 shows a 7-bit status store address being supplied to a local buffer address output 1308. An output from a priority decoder function 1304 may form a second portion of a local buffer address 1308. A local buffer address output 1308 may then be applied as a source address for a local buffer.

In addition to determining which particular channels are active, a control function 1302 may also determine a buffer size for each active channel. Such a function may include comparing a current status store address (i.e., the address of a status store entry that indicates an active channel) to fields in a group register 1318. Such a function was previously described in conjunction with FIG. 10. In the particular example of FIG. 13, determining a buffer size may include indicating if a buffer size is 16 ms, 32 ms, 64 ms or 128 ms. A buffer size can determine the operation of a bit mask function 1306 and a base address selector function 1312. In addition, determining a buffer size may include indicating and/or calculating how many entries exist per channel for a given buffer size. As but one very limited example, in the event each entry stores 0.5 ms of voice data, a 16 ms buffer size may include 32 entries, while a 32 ms buffer size may include 64 entries, etc.

Referring again to FIG. 13, a channel number value multiplied by a buffer entry number value may form one portion of a VPBM offset address output 1310. Another portion of a VPBM offset address output 1310 may be provided by a bit mask function 1306. More particularly, a bit mask function 1306 may provide a selected portion of a time stamp count value as a second portion of a VPBM offset address output 1210. In the particular example of FIG. 12, if a buffer size is 16 ms, five bits [4:0] of a time stamp count value may be output. If a buffer size is 32 ms, 6 bits [5:0] of a time stamp count value may be output. If a buffer size is 64 ms, 7 bits [6:0] of a time stamp count value may be output. If a buffer size is 128 ms, 8 bits [7:0] of a time stamp count value may be output.

An adding function 1314 may add a VPBM offset address output 1310 to a base address to generate a VPBM destination address. A VPBM base address may be selected by a base address selector function 1312 according a sample size value. In the arrangement of FIG. 13, a 16 ms, 32 ms, 64 ms or 128 ms base address may be added to a jitter buffer offset address output 1310 to generate a jitter buffer source address.

Figure 14:
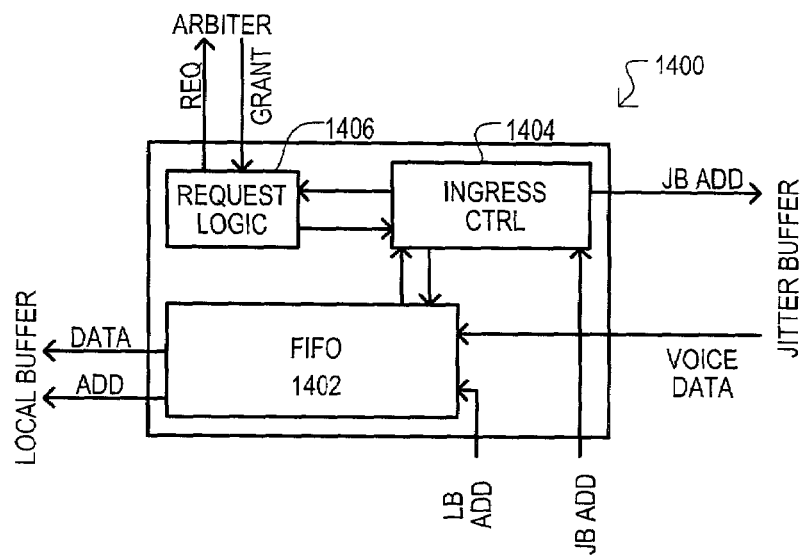
FIG. 14 is a block diagram of an address calculator for an egress block according to one embodiment.

Referring now to FIG. 14, a block diagram is set forth illustrating a processing engine that may be included in an ingress block. A processing engine is designated by the general reference character 1400 and may correspond to a processing engine 914 shown in FIG. 9.

A processing engine 1400 may include a first-in-first-out type store (FIFO) 1402, an ingress control 1404, and request logic 1406. An ingress control 1404 may receive a jitter buffer address (JB ADD). Upon requesting and receiving a grant from an arbiter, a processing engine, a jitter buffer address (JB ADD) may be applied as a read address to a jitter buffer (not shown in FIG. 14). In response to a jitter buffer address, a jitter buffer may return voice channel data (VOICE DATA).

A FIFO 1402 may receive voice data and a local buffer address as inputs. An ingress control 1404 may input a data into FIFO 1402 that includes both voice data and a corresponding local buffer address (local buffer data/address pair). In this way, a sequence of local buffer data/address pairs may be stored within a processing engine 1400. A processing engine 1400 may output local buffer data/address pairs. In response to such output values, voice data may be written to locations determined by corresponding local buffer addresses.

In this way, a processing engine 1400 may be capable of accumulating voice data and local buffer addresses, and then outputting such values to for subsequent storage in a local buffer.

Figure 15A:
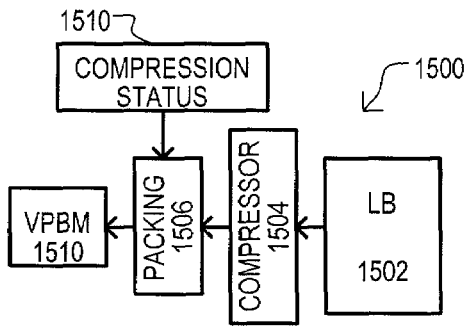
FIGS. 15A and 15B are block diagrams showing embodiments that include compression and decompression of data.

Referring now to FIGS. 15A to 16B, various embodiments are shown that may include compression and/or decompression functions. To better utilize network bandwidth data for transmission may be compressed and then packed into an out-going location. An embodiment employing such data packing is shown in FIGS. 15A and 15B, and designated by the general reference character 1500. A system 1500 may include a local buffer 1502 that may store out-going data, such as voice data for various channels. A compressor 1504 may compress multiple data entries for voice data. A packing 1506 function may then examine a compression status store 1508 to determine if data should be packed for a particular voice channel. If a compression status store 1508 indicates compression, compressed voice data can be written to a particular entry in a VPBM 1510.

It is noted that a compression status store 1508 may have the same general construction as a status store (such as that shown as 208 in FIG. 2 and/or 908 in FIG. 9). A particular portion of an entry may indicate a particular compression format for a given channel.

Figure 15B:
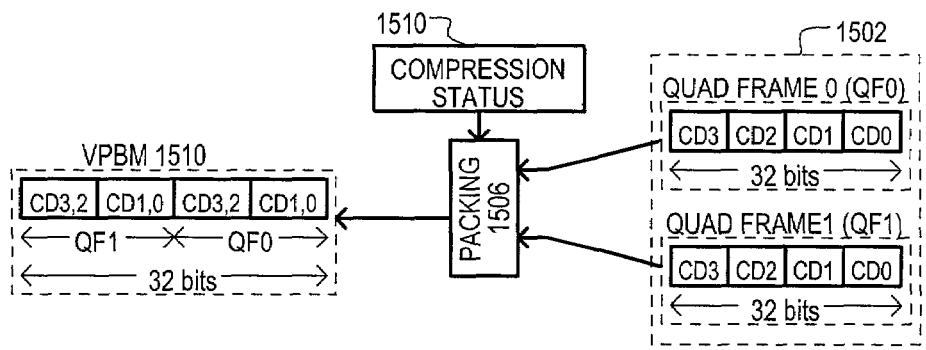
Figure 16A:
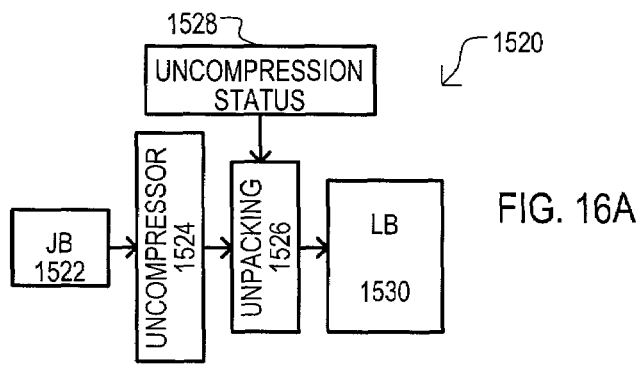
FIGS. 16A and 16B are block diagrams describing a system as shown in FIGS. 15A and 15B with an ingress path having decompression functions.
Figure 16B:
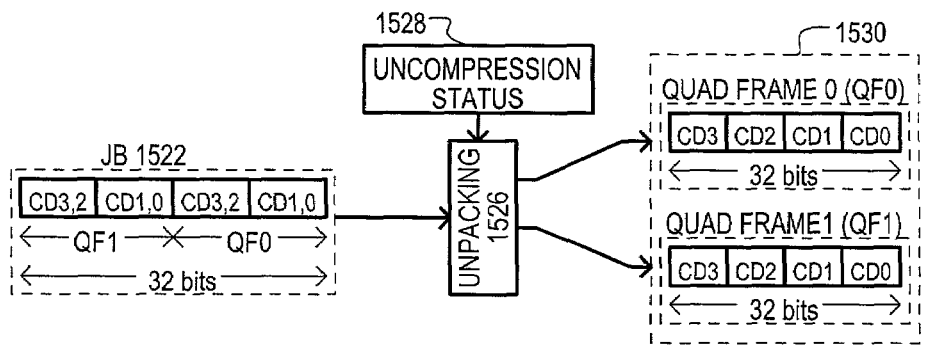

FIG. 15B shows a packing operation in more detail. In FIG. 15B it will be assumed that compressed voice data for two different quad frames (QF0 and QF1) is received from a local buffer 1502. Such voice data includes 32-bits, broken into eight bit compressed data portions (CD0–3). Packing circuit 1506 may pack two quad frame worth of data into a single dword in a VPBM 1510. It is noted that compressed data (CD0–3) may include a byte of voice data compressed into 4-bits with sign extensions in upper bits. A packing circuit 1506 may pack eight bytes of data for the same voice channel spanning two quad frames by removing the signed extension bits. While FIGS. 15A and 15B shows an egress path that can include compression, an ingress path may also include decompression functions. Such a system is shown in FIGS. 16A and 16B and designated by the general reference character 1520. A system 1520 may include a jitter buffer 1522 that may store incoming data, such as voice data for various channels. An uncompressor 1524 may decompress data for a given voice data. An unpacking 1526 function may then examine an uncompression status store 1528 to determine if data should be unpacked for a particular voice channel. If a compression status store 1528 indicates uncompression, uncompressed voice data can be written to particular entries in a local buffer 1530.

FIG. 16B shows an unpacking operation in more detail. In FIG. 16B it will be assumed that data received in a jitter buffer can be compressed and packed according to the procedure shown in FIGS. 15A and 15B. That is, a jitter buffer 1522 may provide compressed packed voice data that span two different quad frames. An unpacking circuit 1526 may unpack such two data by separating the data for the two quad frames, restoring the upper sign bit data, and then writing to two different locations (corresponding to the two different quad frames) in a local buffer 1530.

It is noted that while the various embodiments have described addressing, read and write functions, such functions may include various other operations. As but a few examples, addresses may be "swizzled" or generated according to hashing or other such functions.

Thus, while various embodiments have been described in detail, the present invention could be subject various changes, substitutions, and alterations without departing from the spirit and scope of the invention. Accordingly, the present invention is intended to be limited only as defined by the appended claims.

What is claimed is:

1. A voice data processing system, comprising:
   at least one status store for storing status information on a plurality of voice channels;
   at least one source buffer for storing voice data for the plurality of voice channels and including a valid store for storing at least a valid indication or invalid indication for each voice channel, the valid indication indicating that the corresponding voice channel data is valid, the invalid indication indicating that the corresponding voice channel is not valid; and
   a processing system that accesses the at least one status store and generates read addresses for the at least one source buffer to access voice data for only those voice channels having a predetermined status, and generates write addresses for at least one destination buffer for writing the voice data read from the at least one source buffer to at least one destination buffer, and
   wherein the processing system reads voice data from the at least source buffer and writes the voice data to the at least one destination buffer for only those voice channels having a valid indication.

2. The voice data processing system of claim 1, wherein:
   the status store comprises a dual port memory.

3. The voice data processing system of claim 1, wherein:
   the processing system includes a first-in-first-out buffer (FIFO) that stores voice data and corresponding at least one destination buffer addresses for those voice channels having the predetermined status.

4. The voice data processing system of claim 1, further including:
   a data packing circuit that accesses at least one compression status store and packs compressed data into the at least one destination buffer for only those voice channels having a predetermined compression status.

5. The voice data processing system of claim 1, further including:
   a data unpacking circuit that accesses at least one uncompression status store and unpacks uncompressed data into the at least one destination buffer for only those voice channels having a predetermined uncompression status.

6. A voice data processing system, comprising:
   at least one status store for storing status information on a plurality of voice channels, the at least one status store including a silent store that stores at least a silent indication or an active indication for each voice channel, the silent indication indicating the corresponding voice channel is not carrying voice data, the active indication indicating that the corresponding voice channel is carrying voice data;
   at least one source buffer for storing voice data for the plurality of voice channels and including a local buffer coupled to a synchronous data network; and
   a processing system that accesses the at least one status store and generates read addresses for the at least one source buffer to access voice data for only those voice channels having a predetermined status, and generates write addresses for at least one destination buffer for writing the voice data read from the at least one source buffer to at least one destination buffer, the processing system including an egress engine, and the at least one destination buffer including a voice packet buffer memory (VPBM) coupled to an asynchronous data network, the egress engine outputting voice data and VPBM addresses for those voice channels when the corresponding silent store indication is active, and does not output voice data and the VPBM address when the corresponding silent store indication is silent.

7. The voice data processing system of claim 6, wherein:
   the processing system includes an address generator that generates write addresses from at least a time stamp count value.

8. The voice data processing system of claim 7, wherein:
   the VPBM stores voice channel information according to a voice data sample size value, and the write address is generated from more bits of a timestamp counter for larger sample size values.

9. A voice data processing system, comprising:
   at least one status store for storing status information on a plurality of voice channel;
   at least one source buffer for storing voice data for the plurality of voice channels; and
   a processing system that accesses the at least one status store and generates read addresses for the at least one source buffer to access voice data for only those voice channels having a predetermined status, generates write addresses for at least one destination buffer for writing the voice data read from the at least one source buffer to at least one destination buffer, and includes an ingress engine, the at least one source buffer includes a jitter buffer coupled to an asynchronous data network, and the at least one destination buffer includes a local buffer coupled to a synchronous data network, and further the processing system includes an address generator that generates write addresses for the local buffer from a status store address.

10. A voice data processing system, comprising:
    at least one status store for storing status information on a plurality of voice channel;
    at least one source buffer for storing voice data for the plurality of voice channels; and
    a processing system that accesses the at least one status store and generates read addresses for the at least one source buffer to access voice data for only those voice channels having a predetermined status, generates write addresses for at least one destination buffer for writing the voice data read from the at least one source buffer to at least one destination buffer, includes an ingress engine, the at least one source buffer includes a jitter buffer coupled to an asynchronous data network, and the at least one destination buffer includes a local buffer coupled to a synchronous data network, and further the processing system includes an address generator that generates read addresses for the jitter buffer from at least a time stamp value.

11. The voice data processing system of claim 10, wherein:
    the jitter buffer stores voice channel information according to a voice data sample size value; and
    the address generator generates read addresses from more bits of a timestamp counter for larger sample size values.

12. The voice data processing system of claim 10, wherein:
    the address generator generates read addresses for the jitter buffer from at least a portion of read addresses for the status store.

13. The voice data processing system of claim 12, wherein:
the address generator further generates read addresses for the jitter buffer by adding a base address to an offset address generated from at least a portion of read addresses for the status store and a time stamp count value.

14. A voice data processing system, comprising:
at least one local buffer for storing voice data for a plurality of channels that is received from a synchronous voice data source;
at least one voice packet buffer memory (VPBM) for storing voice data for the plurality of channels for transmission over an asynchronous data network;
at least one status store for storing status information for the plurality of voice channels; and
an address generator that accesses the at least one status store for the status information and generates local buffer read addresses and VPBM write addresses for only those voice channels having a first type of status information, the VPBM write addresses being generated from at least one timestamp value.

15. The voice data processing system of claim 14, wherein:
the at least one voice data store includes a first buffer and second buffer, the first local buffer storing voice channel information for a different time period than the second local buffer.

16. The voice data processing system of claim 14, wherein:
the VPBM comprises a plurality of channel entry groups, each channel entry group including $2^x$ channels, where x is an integer; and
the address generator adds the timestamp value to x bits of the base address value to generate the VPBM write address.

17. The voice data processing system of claim 14, wherein:
the VPBM comprises a plurality of channel entry groups arranged according to a buffer size value, each channel entry group being addressable by a base address, the address generator increments a first base address by a voice channel number value multiplied by a buffer size value to generate base addresses.

18. A voice data processing system, comprising:
at least one local buffer for storing voice data for a plurality of channels for transmission over a synchronous voice data source;
at least one jitter buffer memory for storing voice data for the plurality of channels that is received from an asynchronous data network;
at least one status store for storing status information for the plurality of voice channels; and
an address generator that accesses the at least one status store for the status information and generates jitter buffer read addresses and local buffer write addresses for only those voice channels having a first type of status information, the jitter buffer write addresses being generated from at least one timestamp value.

19. The voice data processing system of claim 18, wherein:
the at least one status store includes a plurality of addressable entries, each entry including status information for a plurality of voice channels; and
the address generator combines priority decoded status store entry values with a status store address for the status store entry to generate the local buffer write addresses.

20. The voice data processing system of claim 19, wherein:
the at least one jitter buffer includes a first jitter buffer having a first size and a second jitter buffer having a second size; and
the address generator combines group register value with corresponding timestamp values to generate at least a first portion of the jitter buffer read addresses, the timestamp values being masked according to the size of the jitter buffer being read.

* * * * *